Oct. 4, 1927.
G. W. SAWYER
1,644,090
TANK WAGON
Filed July 18, 1925
2 Sheets-Sheet 1
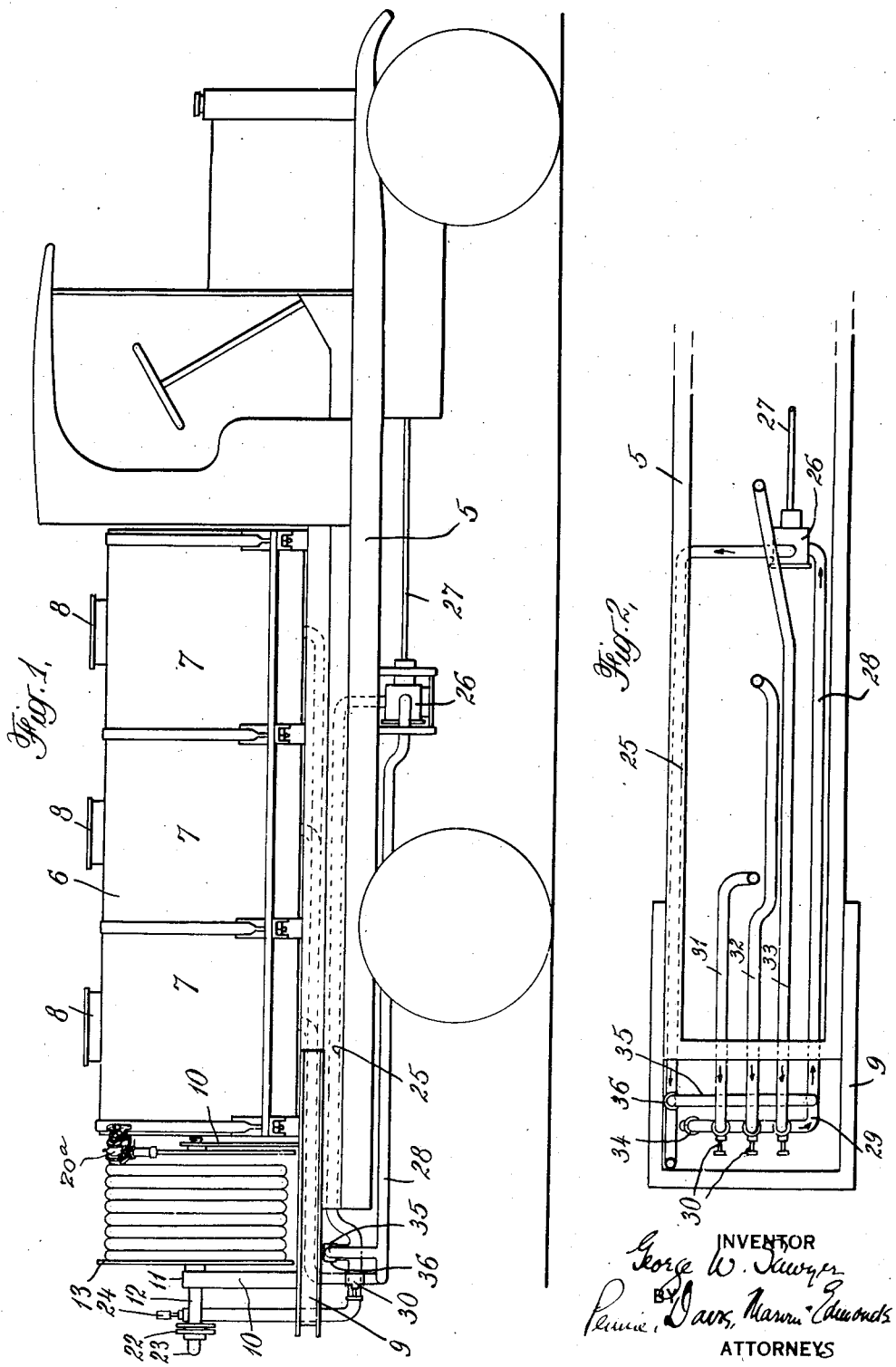
INVENTOR
George W. Sawyer
BY
Pennie, Davis, Marvin & Edmonds
ATTORNEYS Oct. 4, 1927.
G. W. SAWYER
TANK WAGON
Filed July 18, 1925
1,644,090
2 Sheets-Sheet 2
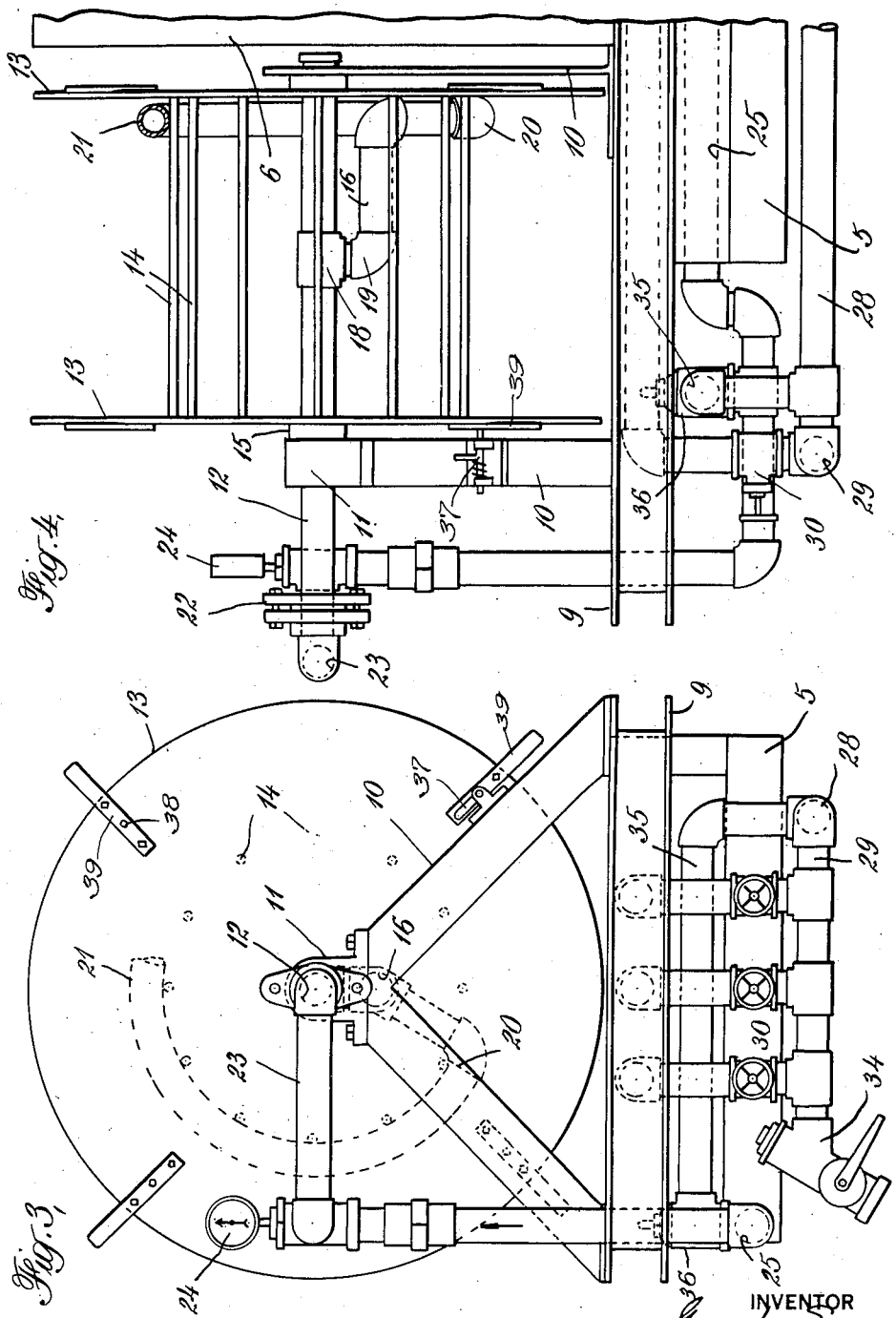

Patented Oct. 4, 1927.

1,644,090

UNITED STATES PATENT OFFICE.

GEORGE W. SAWYER, OF GERMANTOWN, PHILADELPHIA, PENNSYLVANIA, ASSIGNOR TO SINCLAIR REFINING COMPANY, OF CHICAGO, ILLINOIS A CORPORATION OF MAINE.

TANK WAGON.

Application filed July 18, 1925. Serial No. 44,635.

This invention relates to vehicles having tanks for the delivery of liquids, and has to do more particularly with a tank truck which is specially suited for the delivery of liquid fuel, such as heavy fuel oil.

Heating equipment burning oil fuel is now commonly installed in buildings of different types, and delivery of the fuel is customarily made by means of tank trucks which carry large quantities of liquid, so that the weight of the vehicle is quite great. In the case of private residences, the storage tank into which the fuel is discharged is ordinarily at the rear, and direct discharge from the truck into the tank cannot be made unless the truck is driven upon the property over private drive-ways. Such drive-ways are not built to withstand heavy hauling and are often seriously damaged by the weight of the truck. Any method of delivery, other than direct discharge, is slow and laborious, and adds greatly to the fuel cost.

The object of the present invention is to provide a tank truck or similar vehicle, capable of holding large quantities of liquid fuel and so equipped that delivery of the contents may be made at considerable distances from the vehicle. To this end, the truck is provided with a tank, usually divided into a plurality of compartments, with valved outlets leading to a manifold or header. A pump which may be driven by the truck motor is connected to the header on its inlet side and discharges into a connection with a hose carried on a reel mounted preferably at the rear end of the truck. The hose is provided with a valve at its end by which the flow may be controlled and in order to prevent damage to the equipment, in the event that the valve is closed while the pump is acting, there is a by-pass around the pump controlled by a relief valve.

With the truck so constructed, delivery may be made easily at considerable distances from the truck and direct discharge is provided for. The contents of the truck tank may also be discharged into a receptacle close to the truck without difficulty, since one end of the hose is always connected to the pump outlet and as great a length of hose as may be necessary may be secured by unwinding the reel. When the delivery is completed, the hose valve is closed, and the hose rewound on the reel. This makes the opera-
tion simple and avoids handling loose lengths of hose which may drip and thus cause damage.

In the accompanying drawings there is illustrated that embodiment of the invention which is now preferred, and in these drawings, Fig. 1 is a view in elevation of a tank truck on which the reel is mounted, Fig. 2 is a plan view of a part of the vehicle structure, showing the pipe connections beneath the tanks, Fig. 3 is a rear end view showing the connections to the hose on the reel, Fig. 4 is a side view of the reel, showing certain of the piping connections beneath it.

Referring now to these drawings, the vehicle is indicated generally at 5, as a motor truck of any conventional type. On the body of the truck is mounted a tank 6 for the liquid, which may be divided into a plurality of smaller compartments 7, each of which has an inlet opening 8 at the top. The tank is of the ordinary construction, and as illustrated, is of a size such that it may contain large quantities of liquid fuel.

Mounted at the rear of the truck, on a U-shaped extension 9, from the truck frame, are upright A frames 10, made of any convenient material, such as angle iron, on which are carried bearings 11, having a tubular axle 12. Mounted on this axle are discs 13, connected by a series of rods 14 which form a hose reel. The reel is held in place on the axle in any convenient manner, as by means of collars 15. A pipe 16 is connected to the tubular axle at its central point by fittings 18 and 19, and this pipe is, in turn, connected through suitable fittings to the end of a hose 20, of any standard type, the hose being wound around the reel, as indicated at 21. The end of the hose carries a valve 20ª by which flow through the hose may be controlled.

Beyond the A frame the axle 12 is connected by a suitable joint connection 22, to a piping 23, in which is a pressure gauge 24, this piping leading downwardly to a point beneath the frame and then longitud'nally, as indicated at 25, to the outlet of a pump 26, having a shaft 27, by which it may be driven from the truck motor. The inlet of the pump is connected by piping 28 to a transverse header or manifold 29 at the rear end of the vehicle, and connected to this header through individual valves 30, are outlet pipes 31, 32, and 33, which lead to the separate compartments of the tank, here shown as three in number. At the end of the header, there is a fitting 34, provided with a draw-off valve, so that the header and the tank compartments may be drained. Also extending between the outlet pipe 25 and the inlet pipe 28, is a by-pass 35, provided with a pressure relief valve 36.

To hold the reel in fixed position when the hose has been unreeled the desired amount, a spring operated latch 37 is provided. While the latch may be carried by either the reel or a fixed part of the frame, it is preferably secured to the frame and is received in openings 38 in members 39 which are secured to the discs 13.

With a tank truck so equipped it will be seen that when delivery is to be made the hose is wound off the reel and connected to the receptacle into which the fuel is to be delivered. The valve 30 which connects the header with the compartment from which delivery is to be made, is now opened and the pump started. The liquid fuel flows from the compartment into the header, and is then drawn through the pump and discharged into the hose. By mounting a valve at the end of the hose, the delivery of the liquid may be carefully regulated, and when the desired quantity of fuel has been discharged, the valve may be closed so that the hose will not drip when it is being reeled up. At the same time, if by accident, the hose valve should be closed while the pumping is continued, as soon as pressure is built up to the required extent, the relief valve 36 will open so that the liquid will be bypassed around the pump in a continuous circuit. This prevents damage to the hose through careless manipulation of the equipment. Also, by providing the header, as described, it is possible to make use of a tank divided into small compartments. This is advantageous not only because it may be desirable to carry different kinds of fuel in the different compartments, but also because, by using small compartments, the surging effect which would be present in a long tank not subdivided, is largely overcome.

The new equipment provides a convenient and compact arrangement for the delivery of liquids at considerable distances from the vehicle, and the cost of providing the additional equipment on a truck is relatively small. A truck so equipped is not only much more efficient on account of the greater rapidity with which delivery may be made, but it also avoids any possibility of damage to the property where the fuel is to be delivered. Furthermore, with this type of equipment, it is possible for one man to make delivery of the fuel, since, by reason of the provision of the by-pass, he may start the pump while the valve at the end of the hose is closed, and may then carry the hose to the point where fuel is to be discharged into the receptacle. The pump may be kept operating even though no liquid is being discharged, and there is no possibility that damage to the equipment will ensue. This greatly simplifies the operation and cheapens the cost of fuel distribution.

I claim:

1. A tank wagon comprising in combination a plurality of tanks mounted on the frame thereof, a manifold connected to said tanks and adapted to receive fluid therefrom, a pump having the inlet thereof connected to said manifold, a delivery conduit connected to the discharge side of the pump, a single by-pass leading from said delivery conduit to a point in advance of the inlet of the pump and including a relief valve, and a valve in said delivery conduit located beyond said by-pass, said by-pass forming with the pumping system a circuit through which fluid from the pump may pass in a circulatory manner when the valve in the delivery conduit is closed.

2. A tank wagon comprising in combination a tank mounted on the frame thereof, a pump, a hose reel mounted on the frame of the wagon, a hose adapted to be reeled thereon, a connection between the hose and the pump outlet, and a by-pass connected at one end on the pressure side of the pump and at the other end to the low pressure side thereof, said by-pass being controlled by a relief valve, whereby the liquid being pumped is permitted to circulate through the by-pass should the passage through the hose be obstructed.

3. A tank wagon comprising in combination a tank mounted on the frame thereof, a pump, a hose reel mounted on the frame of the wagon, a hose adapted to be reeled thereon having adjacent its end a manually controlled valve, a connection between the hose and the pump outlet, cooperating means carried by the frame and reel for latching the reel in fixed position, and a by-pass connected at one end on the pressure side of the pump and at the other end to the low side thereof, said by-pass being controlled by a relief valve, whereby the liquid being pumped is permitted to circulate through the by-pass should the passage through the hose be obstructed.

In testimony whereof I affix my signature.

GEORGE W. SAWYER.